Patented Apr. 29, 1924.

1,492,193

UNITED STATES PATENT OFFICE.

CARL BEINDL, OF FRANKFORT-ON-THE-MAIN, GERMANY.

METHOD OF PRODUCING HYDROCYANIC ACID.

No Drawing.   Application filed April 6, 1923.   Serial No. 630,404.

*To all whom it may concern:*

Be it known that I, CARL BEINDL, a citizen of the Republic of Germany, residing at Frankfort-on-the-Main, Germany, have invented a certain new and useful Method of Producing Hydrocyanic Acid, of which the following is a specification.

This invention relates to the production of hydrocyanic acid and has for its object to increase the yield obtainable.

According to this invention hydrocyanic acid is made by passing nitrogen, hydrogen, and gaseous carbon compounds, such as carbon monoxide, over heated contact materials together with a small quantity of other gases which favor the reaction.

While it is known that hydrocyanic acid can be produced by passing ammonia and carbon compounds over heated catalysts, I have found that good yields can be obtained by using nitrogen itself instead of nitrogen compounds. This is accomplished by adding to the reaction gases certain other gases which favor the reaction and by using proper mixtures of contact bodies, but the kind and amount of additional gases used depends upon the nature of the catalysts.

The following substances can be used as contact materials: uranium, tungsten, titanium, rhodium, osmium, molybednum, magnesium, aluminum, the elements of the iron group, the group of the rare earth metals, or alloys or compounds of the same. If metals or metallic alloys are used as catalysts they are preferably oxidized before use by heating for a short time in a current of air. Favorable results are obtained using mixtures of the foregoing contact materials in such proportion that one component predominates. Further these contact materials may be activated by the addition of compounds of alkali, alkali earths or earth metals.

A preferred method of preparing contact materials is by placing suitable compounds, such as carbonates or nitrides, or even oxides, in the contact-tube itself and subjecting them to the action of the reaction gases at an elevated temperature. The contact bodies so formed may consist of mixtures of metal, metal nitride and metal oxide and show excellent catalytic effect over long periods. In carrying out this invention, nitrogen, hydrogen, and gaseous or volatile carbon compounds, such as carbon monoxide, are passed over the contact material at temperatures varying from 350 to 800° C. The use of pure gases is less suitable than those containing foreign gases such as oxygen and air which have been found to improve the reaction. The kind and quantity of the gas to be added depends upon the nature of the reacting gases and contact bodies used. The addition of comparatively small quantities of foreign gases, such as from 1 to 15% of the reaction gases, is generally beneficent. As a specific example of this invention, a gaseous mixture comprising 1 part by volume of nitrogen, 2 parts by volume of carbon monoxide, 3 parts by volume of hydrogen, to which has been added 2 to 5% of air, is passed at ordinary pressure through a tube filled with uranium carbide and maintained at a temperature of 510° C.

What I claim is:

1. The process for producing hydrocyanic acid, which comprises passing nitrogen, hydrogen, and gaseous carbon compounds over heated contact material together with small quantities of oxygen.

2. The process for producing hydrocyanic acid, which comprises passing nitrogen, hydrogen, and gaseous carbon compounds over heated contact material together with small quantities of air.

3. The process for producing hydrocyanic acid, which comprises passing nitrogen, hydrogen, and carbon monoxide over a mixture of contact materials together with small quantities of oxygen.

4. The process for producing hydrocyanic acid, which comprises passing nitrogen, hydrogen, and carbon monoxide over a mixture of contact materials together with small quantities of air.

5. The process for producing hydrocyanic acid, which comprises passing nitrogen, hydrogen, and gaseous carbon compounds over heated contact material together with small quantities of other gases which favor the reaction at a temperature of about 500° C.

6. The process for producing hydrocyanic acid, which comprises passing about one part by volume of nitrogen, 2 parts by volume of carbon monoxide, and 3 parts by volume of hydrogen, over heated contact materials, together with from about 2 to 5% of air.

In testimony whereof I have signed my name to this specification in the presence of two subscribing witnesses.

CARL BEINDL.

Witnesses:
BASIL E. SAVARD,
C. C. L. B. WYLES.